United States Patent
Baar et al.

(10) Patent No.: US 7,256,801 B2
(45) Date of Patent: Aug. 14, 2007

(54) ELASTIC PRESENTATION SPACE

(75) Inventors: David J. P. Baar, Vancouver (CA); M. Sheelagh T. Carpendale, Alberta (CA); David J. Cowperthwaite, Burnaby (CA); Mark Tigges, Vancouver (CA); Robert Komar, Vancouver (CA); Jerome F. Bauer, Vancouver (CA)

(73) Assignee: Idelix Software Inc., Vancouver (CA)

( * ) Notice: Subject to any disclaimer, the term of this patent is extended or adjusted under 35 U.S.C. 154(b) by 0 days.

(21) Appl. No.: 10/856,807

(22) Filed: Jun. 1, 2004

(65) Prior Publication Data
US 2004/0217979 A1 Nov. 4, 2004

Related U.S. Application Data

(63) Continuation of application No. 09/978,773, filed on Oct. 18, 2001, now Pat. No. 6,768,497.

(30) Foreign Application Priority Data
Oct. 18, 2000 (CA) .................................. 2323569

(51) Int. Cl.
*G09G 5/00* (2006.01)
(52) U.S. Cl. ...................... 345/647; 345/428; 345/619; 345/646; 345/660; 345/661; 345/689; 715/788
(58) Field of Classification Search ................ 345/585, 345/661, 662, 689, 428, 619, 660, 646–647, 345/901; 715/788
See application file for complete search history.

(56) References Cited

U.S. PATENT DOCUMENTS

| 5,670,984 | A | * | 9/1997 | Robertson et al. ........... 345/585 |
| 5,689,287 | A | * | 11/1997 | Mackinlay et al. ......... 345/427 |
| 5,949,430 | A | * | 9/1999 | Robertson et al. ........... 345/619 |
| 6,407,747 | B1 | * | 6/2002 | Chui et al. .................. 345/660 |
| 6,515,678 | B1 | * | 2/2003 | Boger ........................ 345/660 |
| 6,608,631 | B1 | * | 8/2003 | Milliron ..................... 345/647 |

* cited by examiner

*Primary Examiner*—Kee M. Tung
*Assistant Examiner*—Antonio A Caschera
(74) *Attorney, Agent, or Firm*—Joseph Conneely; McCarthy Tetrault LLP

(57) ABSTRACT

A method for displaying visual information on a display screen of a computer, comprising the steps of scaling the visual information to produce a scaled representation to fit on the display screen the scaled representation containing the entire content of the visual information; selecting a region of interest within the scaled representation; applying a transformation to the scaled representation to improve the visual detail in the region of interest; and, displaying the transformed presentation on the display screen.

99 Claims, 5 Drawing Sheets

ELASTIC PRESENTATION SPACE

This application is a continuation of U.S. patent application Ser. No. 09/978,773, filed Oct. 18, 2001, and incorporated herein by reference, which claims priority from Canadian Patent Application No. 2,323,569, filed Oct. 18, 2000, and incorporated herein by reference.

FIELD OF THE INVENTION

The invention relates to the field of computer graphics processing, more specifically, the invention relates to a system and method for applying detail-in-context viewing techniques and elastic presentation space technologies to online and electronic presentation of viewable media, such as newspapers, telephone directories, and maps.

BACKGROUND OF THE INVENTION

Display screens are the primary visual display interface to a computer. One problem with these visual display screens is that they are limited in size, thus presenting a challenge to user interface design, particularly when larger amounts of information is to be displayed. This problem is normally referred to as the "screen real estate problem".

Well known solutions to this problem include panning, zooming, scrolling or combinations thereof. While these solutions are suitable for a large number of visual display applications, these solutions become less effective where the visual information is spatially related, such as maps, newspapers and such like. In this type of information display, panning, zooming and/or scrolling is not as effective as much of the context of the panned, zoomed or scrolled display is hidden.

A recent solution to this problem is the application of "detail-in-context" presentation techniques to the display of large surface area media, such as maps. Detail-in-context presentation techniques take on many forms and are useful for displaying large amounts of information on limited size computer screens, and are becoming more important with the increased use of hand held computing devices such as personal digital assistance (PDA's) and cell phones.

Now, in the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

Detail-in-context presentations allow for magnification of a particular region of interest (the "focal region") in a representation while preserving visibility of the surrounding representation. In other words, in detail-in-context presentations focal regions are presented with an increased level of detail without the removal of contextual information from the original representation. In general, a detail-in-context presentation may be considered as a distorted view (or distortion) of a portion of the original representation where the distortion is the result of the application of a "lens" like distortion function to the original representation. A detailed review of various detail-in-context presentation techniques may be found in a publication by Carpendale, Marianne S. T., titled "A Framework for Elastic Presentation Space" (Burnaby, British Columbia: Simon Fraser University, 1999)) and incorporated herein by reference.

One shortcoming of current Electronic Presentation Space (EPS) graphics technology and detail-in-context presentation methods is that they are computationally inefficient. Considerable computer processing is required to distort a given presentation so as to produce a detail-in-context "lens", and to move the lens through the data with adequate performance to provide an acceptable level of interactivity to the user.

Another shortcoming lies in the level of accuracy of magnification that these methods provide, since detail-in-context methods such as those described in Keahey's *Non-Linear Magnification* (Keahey, T. Alan, Nonlinear Magnification (Indiana University Computer Science, 1997)) require an interative approach to transform a data representation into a detail-in-context presentation at a given desired magnification.

A need therefore exists for a method and system that will allow for the effective implementation of EPS graphics technology for the online and electronic presentation of printed media. Consequently, it is an object of the present invention to obviate or mitigate at least some of the above-mentioned disadvantages.

SUMMARY OF THE INVENTION

According to one aspect of the invention, there is provided a method for displaying visual information on a display screen of a computer. The method comprises the steps of scaling the visual information to produce a scaled representation to fit on the display screen the scaled representation containing the entire content of the visual information; selecting a region of interest within the scaled representation; applying a transformation to the scaled representation to improve the visual detail in the region of interest; and, displaying the transformed presentation on the display screen.

According to another aspect of the invention, a data processing system is provided. This data processing system has stored therein data representing sequences of instructions which when executed cause the above-described method to be performed. The data processing system generally has an input device, a central processing unit, memory, and a display.

According to another aspect of the invention, a computer software product is provided. This computer software product contains sequences of instructions which when executed cause the above-described method to be performed.

According to another aspect of the invention, an integrated circuit product is provided. This integrated circuit product contains sequences of instructions which when executed cause the above-described method to be performed.

BRIEF DESCRIPTION OF THE DRAWINGS

The invention may best be understood by referring to the following description and accompanying drawings which illustrate the invention. In the drawings.

DETAILED DESCRIPTION OF THE PREFERRED EMBODIMENTS

Figure 1:
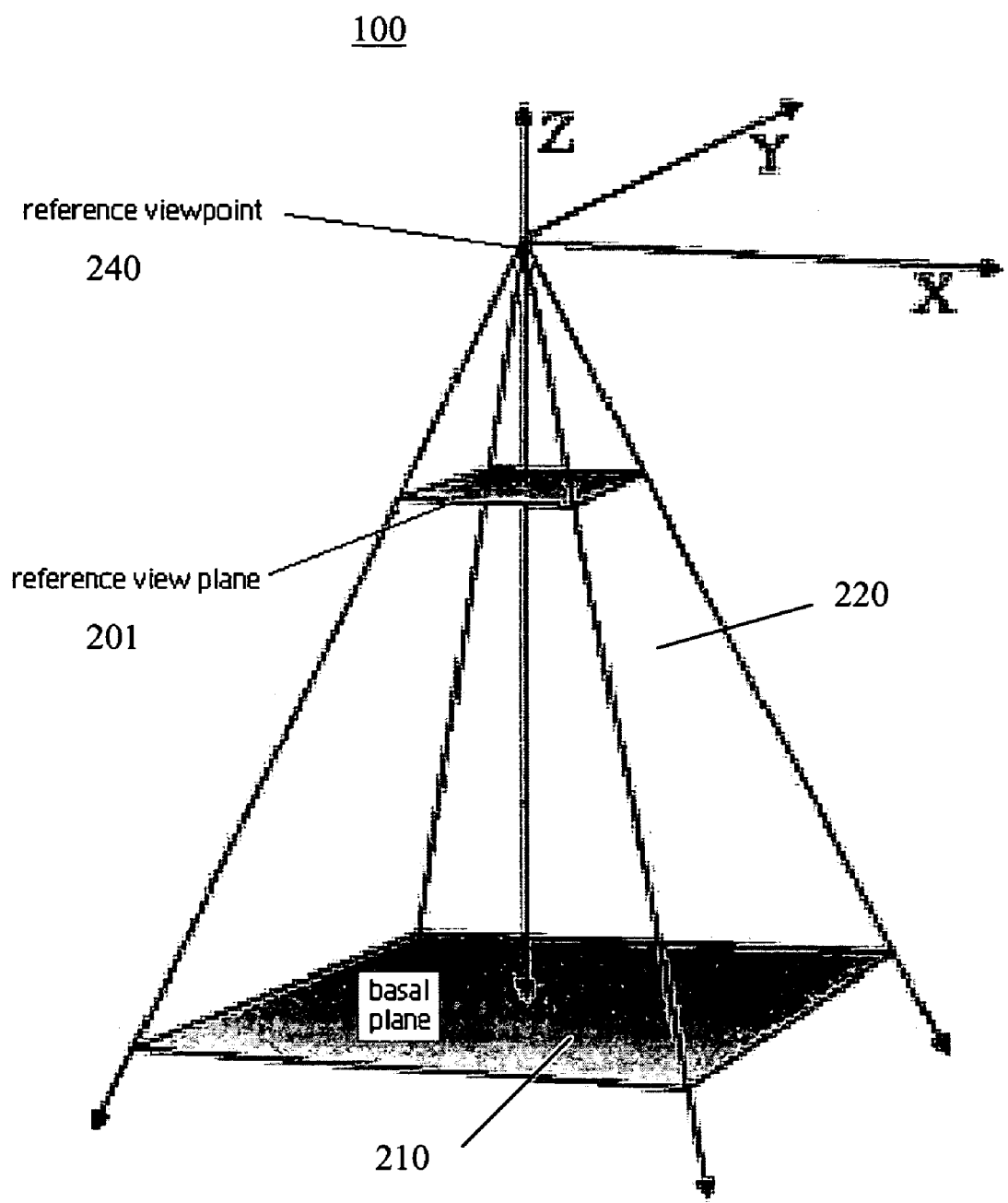
FIG. 1 is a perspective view of a 3D perspective viewing frustrum in accordance with known elastic presentation space graphics technology;.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term "data processing system" is used herein to refer to any machine for processing data, including the computer systems and network arrangements described herein. The term "PliablePaper™" is used herein to refer to a computer software product that implements the method of the preferred embodiment of the invention. The term "Elastic Presentation Space" or "EPS" is used herein to refer to techniques that allow for the adjustment of a visual presentation without interfering with the information content of the representation. The adjective "elastic" is included in the term as it implies the capability of stretching and deformation and subsequent return to an original shape. EPS graphics technology is described by Carpendale in *A Framework for Elastic Presentation Space* (Carpendale, Marianne S. T., *A Framework for Elastic Presentation Space* (Burnaby, British Columbia: Simon Fraser University, 1999)) which is incorporated herein by reference.

In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection. In the drawings, like numerals refer to like structures or processes.

In general, the present invention provides a method, system, computer program product, and integrated circuit product for applying detail-in-context viewing techniques and elastic presentation space technologies to the online and electronic presentation of viewable media. The method, system, computer program product, and integrated circuit product are applicable to detail-in-context navigation within computer graphics processing systems including EPS graphics technology and to computer graphics processing systems in general.

Referring to FIG. 1, there is shown a perspective view 100 of a 3D perspective viewing frustrum 220 in accordance with known elastic presentation space ("EPS") graphics technology. In EPS, detail-in-context views of 2D visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
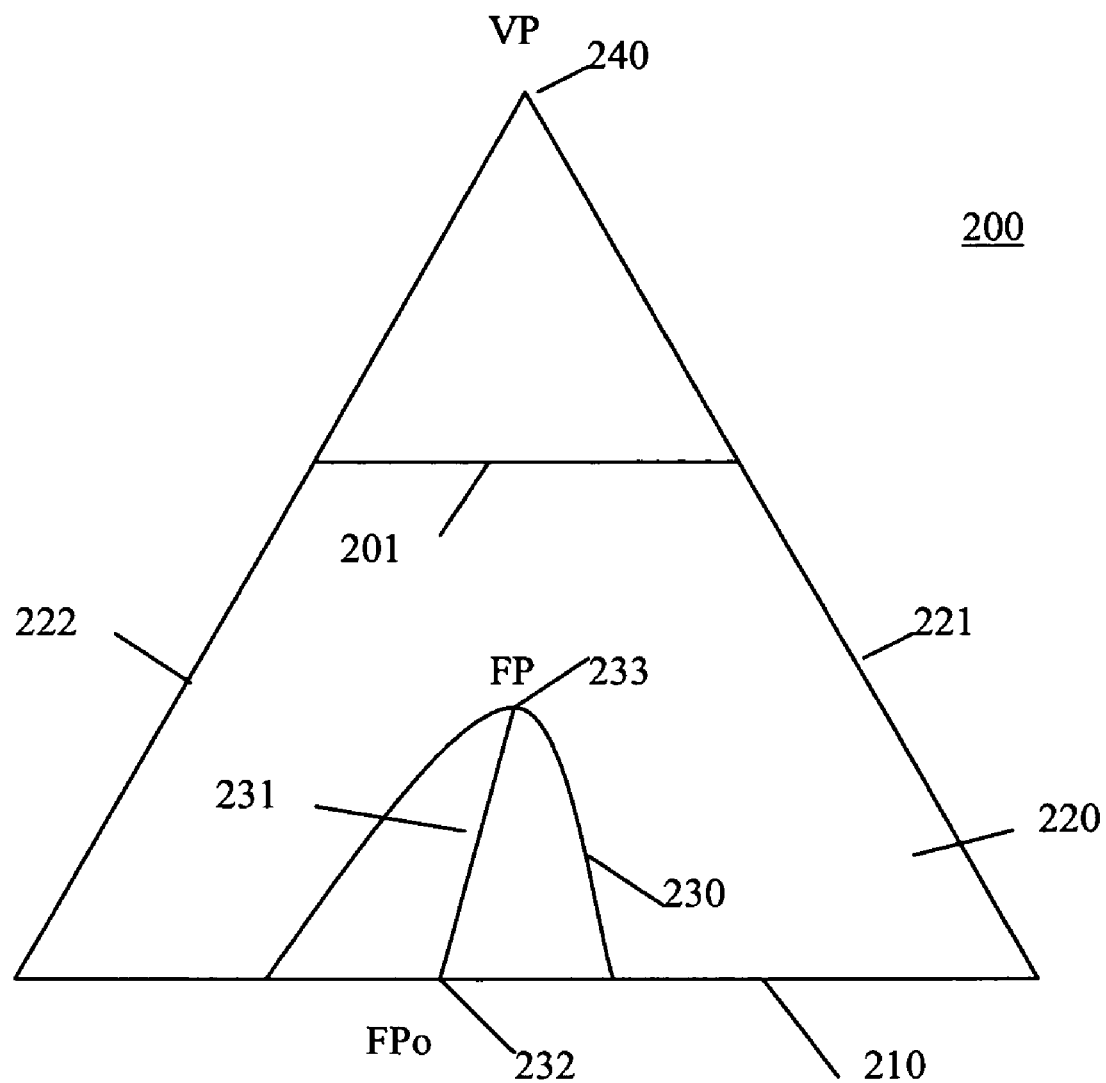
FIG. 2 is a cross-sectional view of a presentation in accordance with known elastic presentation space graphics technology.

Referring to FIG. 2, there is shown a cross-sectional view of a presentation 200 in accordance with known EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. A viewpoint ("VP") 240 is located above the centre point of the basal plane 210 and reference view plane 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230.

To reiterate, EPS refers to a collection of know-how and techniques for performing "detail-in-context viewing" (also known as "multi-scale viewing" and "distortion viewing") of information such as images, maps, and text, using a projection technique summarized below. EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired, in combination with compression of a restricted range of areas of the remaining information (the "context"), the end result typically giving the appearance of a lens having been applied to the display surface. EPS has numerous advantages over conventional zoom, pan, and scroll technologies, including the capability of preserving the visibility of information outside the local region of interest.

In general, in EPS, the source image to be viewed is located in the basal plane. Magnification and compression are achieved through elevating elements of the source image relative to the basal plane, and then projecting the resultant distorted surface onto the reference view plane. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation.

For example, and referring to FIGS. 1 and 2, in two dimensions, EPS can be implemented through the projection of an image onto a reference plane 201 in the following manner. The source image is located on a basal plane 210, and those regions of interest 233 of the image for which magnification is desired are elevated so as to move them closer to a reference plane situated between the reference viewpoint 240 and the reference view plane (RVP) 201. Magnification of the "focal region" 233 closest to the RVP varies inversely with distance from the RVP 201. As shown in FIGS. 1 and 2, compression of regions outside the focal region 233 is a function of both distance from the RVP 201, and the gradient of the function describing the vertical distance from the RVP 201 with respect to horizontal distance from the focal region 233. The resultant combination of magnification and compression of the image as seen from the reference viewpoint 240 results in a lens-like effect similar to that of a magnifying glass applied to the image, and the resultant distorted image may be referred to as a "pliable display surface". Hence, the various functions used to vary the magnification and compression of the image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
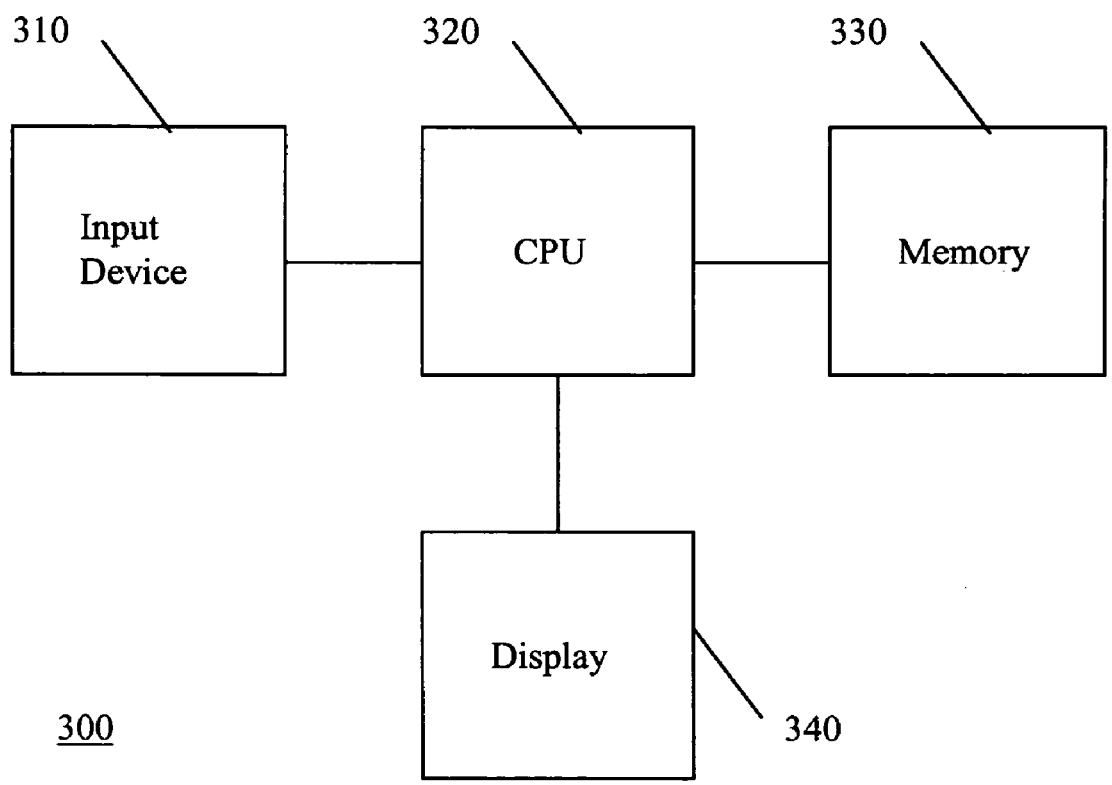
FIG. 3 is a block diagram of a data processing system in accordance with the preferred embodiment.

System. Referring to FIG. 3, there is shown a block diagram of an exemplary data processing system 300 for implementing an embodiment of the invention. The data processing system is suitable for implementing EPS technology and for running PliablePaper™ computer software. The data processing system 300 includes an input device 310, a central processing unit or CPU 320, memory 330, and a display 340. The input device 310 may be a keyboard, mouse, trackball, or similar device. The CPU 320 may include dedicated coprocessors and memory devices. The memory 330 may include RAM, ROM, databases, or disk devices. And, the display 340 may include a computer screen or terminal device. The data processing system 300 has stored therein data representing sequences of instructions which when executed cause the method described herein to be performed. Of course, the data processing system 300 may contain additional software and hardware a description of which is not necessary for understanding the invention.

Online and Electronic Presentation of Printed Media Using EPS (PliablePaper™). According to one aspect of the invention, EPS is applied to the electronic and online (i.e. Internet) presentation of traditional printed media and printed documents including newspapers, magazines, and telephone directories. This is affected by the electronic scaling of the document content to a size that allows presentation of the full content on the display surface, with the use of specialized EPS lenses to enlarge regions of interest 233 to make them readable to the user. This method can be used to achieve the more effective presentation of web page content on small display surfaces including handheld computers. This aspect of the invention can be implemented with pre-placed EPS lenses on important content components including headlines, feature articles, tables of contents, and advertisements. Interaction with the reader is such that articles in the reader's region of interest 233 are enlarged automatically via EPS lenses of complex shape to suit the shape of the article or other area of interest.

Figure 4:
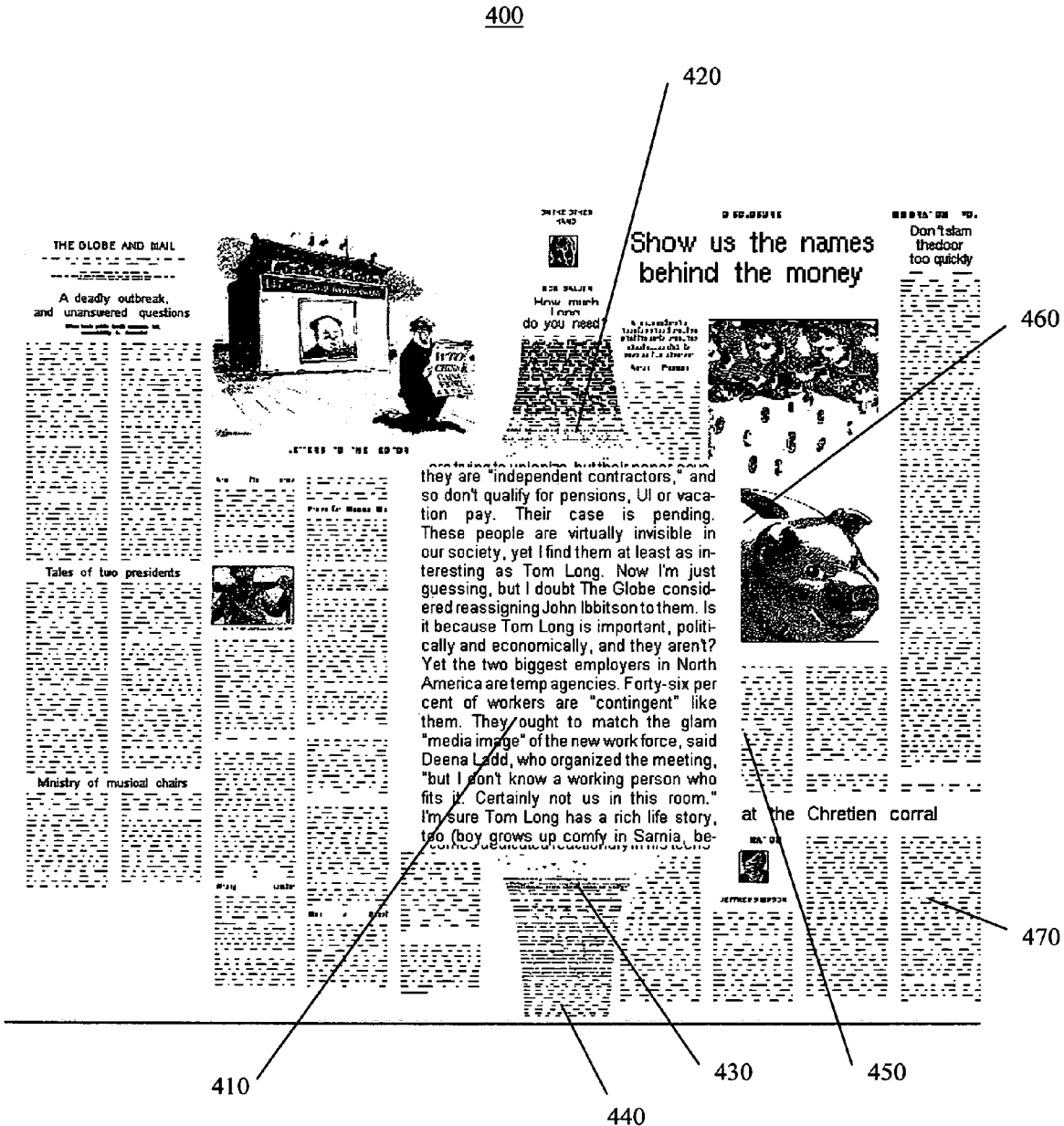
FIG. 4 is a screen capture of two pages from a newspaper information source that have been shrunk to fit a display surface in accordance with the preferred embodiment; and, FIG. 5 is a flow chart illustrating a method for applying detail-in-context viewing techniques and elastic presentation space technologies to the online and electronic presentation of viewable media in accordance with the preferred embodiment.

Referring to FIG. 4, there is shown a screen 400 capture of two pages from a newspaper representation that have been effectively shrunk to fit a display surface 340 in accordance with the preferred embodiment. As noted above, the term "PliablePaper™" is used herein to refer to a computer software product that implements the method of this preferred embodiment of the invention. A lens 410 has been used in the fifth column to increase the font size in the reader's region of interest 233. The top 420 and bottom 430 of the lens 410 are tapered to provide a continuous transition to the unmagnified text 440. Partial overwriting of neighboring columns 450 and images 460 by the lens 410, rather than a lateral distortion, is performed to blend the lens 410 into the undistorted regions 470, and provide enough space for the lens 410 while preserving the spatial orientation of the neighboring columns.

The implementation of pre-placed lenses can be achieved as follows. In order to provide the user with an immediate view of certain regions of a document, items of interest such as article headlines, whole articles, or advertisements can have lenses 410 in place when the document is first viewed. This can be implemented, for example, through the use of special lens locating information (i.e. locating tags) embedded within the source document or in a separate data layer, indicating the characteristics, location and/or bounds of the lens.

The implementation of asymmetric, tapered lenses 410, 420, 430 providing blending into the column of interest can be achieved as follows. The use of such tapering of the lenses provides a direct visual connection and a smooth transition from magnified 410 to unmagnified 440 areas to facilitate the user's navigation of the document. The sides of the lens, which are unnecessary, are not drawn so as to improve performance and preserve the visibility of neighbouring columns 450, 460, 470 where possible.

Again referring the FIG. 4, the partial cutting off of lines of text to facilitate blending in the distorted region of the lens is supported.

The handling of boundary conditions is supported by the inward folding of lenses, as described by Carpendale, when a boundary such as a page border is encountered allowing for the magnification of a column immediately adjacent to the border by effectively shifting the lens contents inward.

To reiterate and expand upon this aspect of the invention, using a combination of EPS technology and Internet technologies, the newspaper industry, for example, is provided with a complete electronic delivery solution for creating and delivering the newspaper, in its current format, to readers who will read the newspaper on-line using their existing hardware technology combined with PliablePaper™ software. In this model, newpaper publishers can license the software and provide it to their readers via on-line downloading. Once the PliablePaper™ software is installed on a reader's machine, the reader can download a copy of the newspaper, or, the newspaper can be delivered each day via the Internet by the newspaper publisher. With PliablePaper™ software, the reader can see each page of the newspaper shrunk down to fit their monitor 340. However, each article heading and each advertisement will be easily readable with a pre-placed EPS lens.

In general, newspaper readers tend to scan the headings of articles before they decide which to read. With the method of the preferred embodiment, readers do not have to change their learned behaviour. For each article of interest, one click of the mouse 310 can activate a pre-placed lens encapsulating a chosen article. This allows the reader to read the article with ease. For each advertisement of interest, one click of the mouse 310 can activate a pre-placed lens encapsulating the entire advertisement which can include the advertiser's web address and other related information. Turning pages can be performed more easily; searching for information on a specific company can be performed more easily; printing a specific article or advertisement can be performed more easily; and, navigation can be performed more easily because it combines two already possessed skills of the reader, namely, the almost innate sense of how a newspaper is structured and the ability to navigate using a mouse. Hence, the method of the preferred embodiment facilitates the above advantages and features while requiring no new skills on the part of the reader.

In general then, lens shapes may be selected by evaluating the content and context of the region to be viewed. For example in newspapers information is layed out in columns, thus the present invention will select an appropriate lens to just fit a particular column width, thus avoiding spill-over into adjacent columns. Further, a snapping action may be used to center a lens on a column. In this case the invention evaluates the information to determine boundaries within the region of interest and places the lens within these boundaries. A similar technique may be used for viewing regions on a map.

Surface Generation Algorithms for Pliable Display Surfaces. According to another aspect of the invention, to achieve accurate magnification and optimize computational performance, pliable display surfaces for EPS are directly generated by sampling the distorted layout space and deriving a polygonal surface from sampled points. This technique has important advantages over approximation techniques such as the use of non-uniform rational b-splines ("NURBS") to implement the surface as described by Watt, et al. (Watt, A. and M. Watt, *Advanced Animation and Rendering Techniques*, Addison-Wesley Publishing, 1992, p.106-108), and incorporated herein by reference.

According to this aspect of the invention, the sample points are selected in such a manner as to provide a sufficient representation of the important features of the data space, including the undistorted regions at original magnification/compression levels, the regions that are within the focal areas of lenses, and finally the boundaries between these regions. The accurate sampling of boundaries is important for achieving correct magnification and can be used in the eventual illumination of the surface to provide a perceptual cue to the user through shading. The sample points are connected to form a grid via an appropriate triangulation algorithm, for example Delauney triangulation as described by Boots (Boots, B. N., *Delauney triangles: An Alternative approach to point pattern analysis*, Proc. Assoc. Am. Geogr. 6 (1974), p.26-29), and incorporated herein by reference, to form a continuous surface. This surface is employed as a medium for the presentation of raster data via texture-mapping as well as to provide the perceptual shading cues revealing the topology of the distorted data space.

It is an advantage of the present invention is that the direct generation of the surface from a set of sample points is superior to alternate methods such as the use of a NURBS surface for the following reasons: direct control over the triangulation of the surface in the regions where lenses pose distinct boundaries; full and accurate control over final magnification where approximated surfaces would result in areas of the surface that are over and under-magnified; and, computing performance enhancements that result from decreasing the number of sample points in regions where additional detail is unnecessary. Use of a more dense grid pattern near the region of interest 233 or where the magnification or the slope of the lens function is large can be used to enhance the smoothness of the visible transition from context into the region of interest 233. Use of a less dense grid pattern elsewhere achievers improved computing performance through the use of an optimized grid pattern.

In summary, because sets of points in the magnified region are projected onto a polygon of specified height above the basal plane, magnification factors can be easily and accurately determined, as they are proportional to this height. Furthermore, other techniques such as splines, which are themselves approximations, lack the accuracy present in the techniques of the present invention. Polygons are also more efficient when displaying large raster files.

Special Lens Types and Enhancements. According to another aspect of the invention, EPS technology is applied to multilayer or composite information through blending and filtering techniques as will be described in the following.

Blending between multiple sets of data within an EPS lens can be used to compare coincident regions of interest 233 from different data sets or layers, for example, to show detailed precipitation, population, and disease data in detail only in a particular region of interest 233 of a geographic map.

Filtering of specific data characteristics or data layers within a lens can also be performed. The data shown within a lens can be filtered such that only data within the desired range or from a specific data layer is drawn. This has application as a data inspection aid, for example, to quickly reveal areas in a geographic map having particularly high populations or disease frequencies.

User Interface Aspects and Components. According to another aspect of the invention, lens characteristics including magnification control, shape, and size can be modified by specific user input via pointing devices 310 or via a pointing device and keyboard keystroke operations as will be described in the following.

Magnification control is provided by a combination of either a keystroke or a single "tap" on a pointing device 310, such as a stylus, to indicate an imminent magnification change request, followed by a straight line stroke of the pointing device to actually set the new magnification in proportion to the distance traveled or the velocity of the pointing device.

Control of lens shape is provided by "dragging" a lens border with a pointing device 310. The result is that the lens border distorts elastically to include the new pointing device position in the set of points within the region of interest 233. In this manner, the user can directly specify changes in the shape of the lens using just a pointing device. This allows the user to specify arbitrary lens shapes. Actual implementation of complex lens shapes is achieved by appending new lenses onto the original lens.

Control of lens size is provided by dragging the lens borders using a pointing device 310 to adjust the lens size.

Implementation of EPS as a Client/Server Application. According to another aspect of the invention, EPS lenses can be implemented in software (e.g. PliablePaper™) within an interactive client-server application over a network. The client software can be self-contained or could exist within an Internet browser as a "plug-in" or accessory. In the case of an Internet browser plug-in, the software can detect the presence of one or more data elements such as images within a web page and allow application of EPS lenses to these elements. The application components residing on the server computer would make multiple resolutions of the data available to the client on demand such that additional detail of the source data can be shown in the lens. In the following, details concerning the implementation of EPS technology in a client-server environment are provided. Note that methods for minimizing network traffic between the client and server in low-bandwidth situations are of particular concern and are addressed in the following.

According to another aspect of the invention, "detail-on-demand" functionality is provided as follows. In the original display of a lens applied to data such as an image, the client software displays the focal region 233 of the EPS lens in low resolution until the pointing device 310 has paused or "hovered" over a particular region of interest. If the lens remains in the same position for a period of time, then additional data will be retrieved from the server to fill in additional detail in the magnified region and neighbouring regions. High resolution is beneficial in the neighbouring regions for blending the lens border into the context if the slope of the lens borders is large. This minimizes network traffic while the user is navigating over a region of the data rather than examining it in detail.

According to another aspect of the invention, "adaptive pre-fetching" functionality is provided as follows. This technique is used to improve response time (i.e. performance) of lenses to input from a pointing device 310 by retrieving data from the server in advance of the need for it; it is a predictive technique. A pointing device 310 controls the lens position, and the acceleration, velocity and position of the device can be used to predict the next position of the lens. In this manner, an estimate can be made of the next required high-resolution data, and it can be retrieved from the server over the network in advance of it being needed.

Control of EPS Lens by Global Positioning Satellite (GPS) Receiver, Cell Phone, or Other External Data Source. According to another aspect of the invention, EPS lens locations and/or parameters are controlled by an external data source such as a GPS receiver or cell phone. In the GPS case, an EPS lens location on a map shown on a display surface can be determined by physical location information provided by a GPS receiver coupled to the data processing system 300. In this manner, detailed navigational information in the user's vicinity can be provided in the context of a larger scale map. Alternately, location information provided automatically by a cellular phone system or network can be used to locate the device user and position a lens appropriately. This aspect of the invention can be implemented in enhanced automobile dashboard, marine, and aircraft navigation systems, as well as personal navigational aids on handheld computing devices. In addition, a lens shaped to the intended path of the user from a current location to a destination on a map can be implemented.

Automatic Motion. According to another aspect of the invention, timed motion of an EPS lens over data such as text 400 to allow reading of text or scanning of images or maps without the need for intervention by the user is provided. This aspect of the invention can be implemented in multimedia, PliablePaper™, reading aids for the disabled, as well as in advertising.

EPS as a Solution to the "Labeling Problem". According to another aspect of the invention, a solution is provided to a problem commonly encountered in labeling images and maps wherein there is insufficient space for labels, particularly as the scale of a map changes and the details to be labeled are spatially dense. EPS provides a solution to this problem in the case of electronic display surfaces through capabilities such as detail-in-context viewing and folding (as described by Carpendale) that allow the user to dynamically adjust the displayed level of detail and move undesired labels out of the line of sight of the user.

Figure 5:
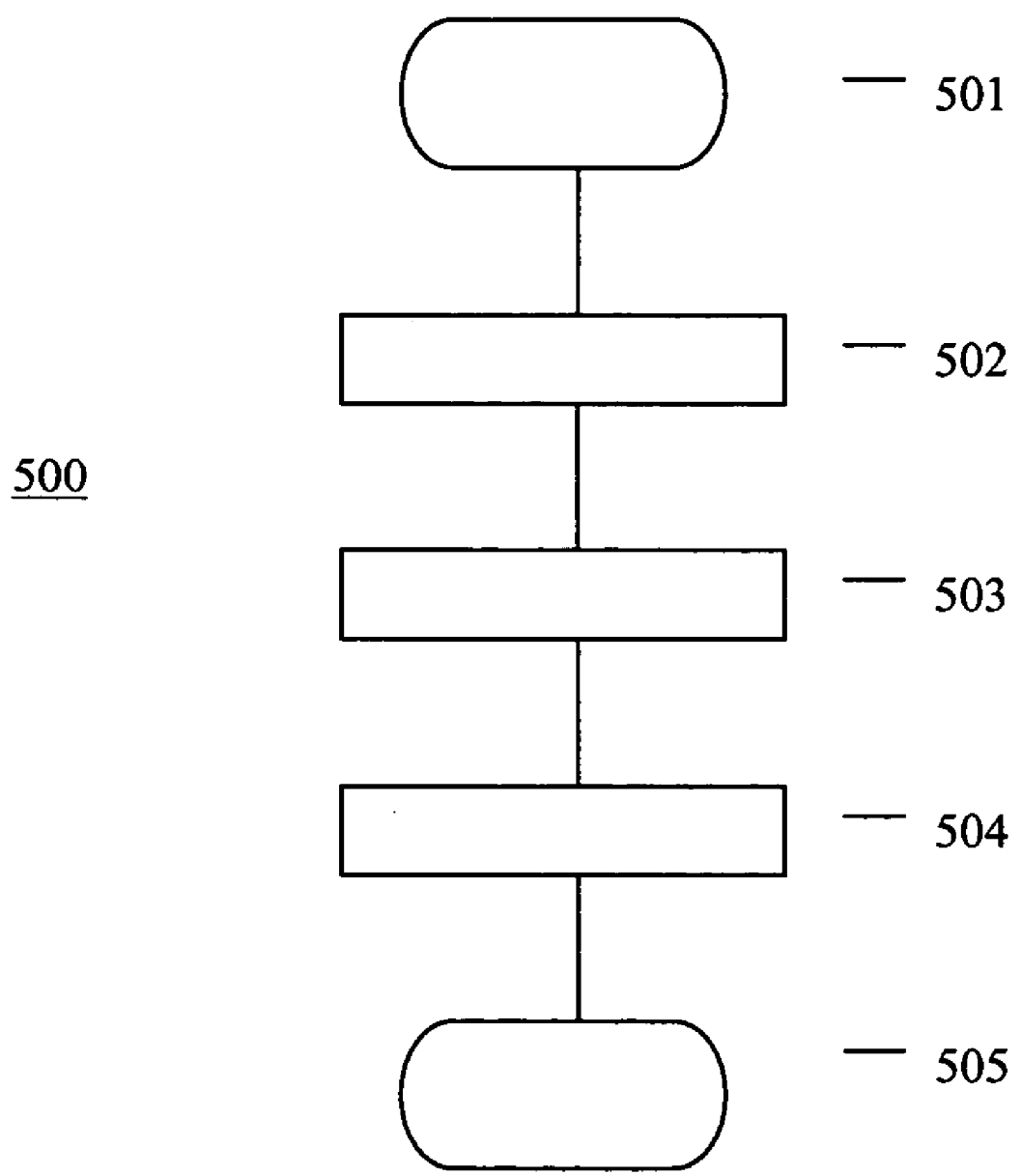

Method. Referring to FIG. 5, there is shown a flow chart 500 illustrating a general method for displaying data representations of printed media on a display screen of a computer according to one embodiment of the invention. At step 501, the method starts. At step 502, the data representation is scaled to produce a scaled data representation wherein the scaled data representation contains the entire content of the data representation and wherein the scaled data representation fits on the display screen. At step 503, a region of interest in the scaled data representation is deformed with a lens to produce a data presentation. At step 504, the data presentation is displayed on the display screen, thereby improving the legibility of the region of interest within the context of the scaled data representation. At step 505, the method ends.

Computer Software Product. The sequences of instructions which when executed cause the method described herein to be performed by the exemplary data processing system of FIG. 3 can be contained in a computer software product according to one embodiment of the invention. This computer software product can be loaded into and run by the exemplary data processing system of FIG. 3.

Integrated Circuit Product. The sequences of instructions which when executed cause the method described herein to be performed by the exemplary data processing system of FIG. 3 can be contained in an integrated circuit product including a coprocessor or memory according to one embodiment of the invention. This integrated circuit product can be installed in the exemplary data processing system of FIG. 3.

Although the invention has been described with reference to certain specific embodiments, various modifications thereof will be apparent to those skilled in the art without departing from the spirit and scope of the invention as outlined in the claims appended hereto.

We claim:

1. A system for displaying a region of interest within visual information on a display screen, said system having memory and an input device, comprising:
   a processor coupled to said memory, display screen, and input device and adapted for:
   applying a transformation to said visual information to improve visual detail in said region of interest by: creating a lens surface having a predetermined lens surface shape for said region of interest; and, creating a presentation by overlaying said visual information on said lens surface and projecting said lens surface with said information onto a plane; said lens surface shape causing overwriting of at least a portion of said visual information adjacent to said region of interest and tapering of at least a portion of said lens surface into at least one undistorted area of said visual information; and,
   displaying said presentation on said display screen.

2. The system of claim 1 wherein said lens surface shape preserves spatial orientation of said portion of said visual information adjacent to said region of interest.

3. The system of claim 1 wherein said lens surface shape provides sufficient space for said lens surface in said presentation.

4. The system of claim 1 wherein said processor is further adapted for scaling said visual information to fit on said display screen.

5. The system of claim 1 wherein said lens surface is comprised of a plurality of polygonal surfaces constructed from a plurality of points sampled from said lens surface shape.

6. The system of claim 5 wherein said applying a transformation includes selecting parameters for said polygonal surfaces including size, shape, number, density, and pattern.

7. The system of claim 6 wherein said parameters for said polygonal surfaces are selected to optimize computation time for said presentation.

8. The system of claim 6 wherein said density of said polygonal surfaces is increased in regions surrounding said region of interest.

9. The system of claim 6 wherein said density of said polygonal surfaces is increased in regions where said lens surface shape has a slope that exceeds a predetermined value.

10. The system of claim 6 wherein said lens surface shape has a slope and said density of said polygonal surfaces is proportional to said slope.

11. The system of claim 6 wherein said polygonal surfaces are triangles.

12. The system of claim 6 wherein said polygonal surfaces each have a height above a basal plane, said height selected to provide a proportional magnification for at least a portion of said region of interest.

13. The system of claim 6 wherein said polygonal surfaces are selected to provide a uniformly magnified area for at least a portion of said region of interest.

14. The system of claim 1 wherein said region of interest, said lens surface, and said lens surface shape include a plurality of regions of interest, a plurality of lens surfaces, and a plurality of lens surface shapes, respectively.

15. The system of claim 1 wherein said region of interest has a shape and at least a portion of said lens surface shape corresponds to said shape.

16. The system of claim 1 wherein said lens surface shape distorts at least a portion of said region of interest.

17. The system of claim 16 wherein said portion of said region of interest is magnified.

18. The system of claim 16 wherein said portion of said region of interest includes magnified text and increased font size text.

19. The system of claim 16 wherein said lens surface shape has at least one continuous tapered transition from said portion of said region of interest to at least one undistorted area of said visual information.

20. The system of claim 1 wherein said visual information is a page, said page including a newspaper page, a magazine page, a telephone directory page, a map page, and a web page.

21. The system of claim 20 wherein said region of interest includes a headline, a column, an article, a graphic, and an advertisement appearing on said page.

22. The system of claim 1 wherein said display screen is contained in a handheld device.

23. The system of claim 1 wherein said processor is further adapted for moving said lens surface about said visual information over time to provide a dynamic presentation.

24. The system of claim 1 wherein said region of interest is selected based on data provided by an external data source.

25. The system of claim 24 where said external source includes a Global Positioning Satellite (GPS) receiver and a cellular telephone network.

26. A computer program product having a computer readable medium tangibly embodying computer executable code for displaying a region of interest within visual information on a display screen of a computer, comprising:
  code for applying a transformation to said visual information to improve visual detail in said region of interest by: creating a lens surface having a predetermined lens surface shape for said region of interest; and, creating a presentation by overlaying said visual information on said lens surface and projecting said lens surface with said visual information onto a plane; said lens surface shape causing overwriting of at least a portion of said visual information adjacent to said region of interest and tapering of at least a portion of said lens surface into at least one undistorted area of said visual information; and,
  code for displaying said presentation on said display screen.

27. The computer program product of claim 26 wherein said lens surface shape preserves spatial orientation of said portion of said visual information adjacent to said region of interest.

28. The computer program product of claim 26 wherein said lens surface shape provides sufficient space for said lens surface in said presentation.

29. The computer program product of claim 26 and further comprising code for scaling said visual information to fit on said display screen.

30. The computer program product of claim 26 wherein said lens surface is comprised of a plurality of polygonal surfaces constructed from a plurality of points sampled from said lens surface shape.

31. The computer program product of claim 30 wherein said applying a transformation includes selecting parameters for said polygonal surfaces including size, shape, number, density, and pattern.

32. The computer program product of claim 31 wherein said parameters for said polygonal surfaces are selected to optimize computation time for said presentation.

33. The computer program product of claim 31 wherein said density of said polygonal surfaces is increased in regions surrounding said region of interest.

34. The computer program product of claim 31 wherein said density of said polygonal surfaces is increased in regions where said lens surface shape has a slope that exceeds a predetermined value.

35. The computer program product of claim 31 wherein said lens surface shape has a slope and said density of said polygonal surfaces is proportional to said slope.

36. The computer program product of claim 31 wherein said polygonal surfaces are triangles.

37. The computer program product of claim 31 wherein said polygonal surfaces each have a height above a basal plane, said height selected to provide a proportional magnification for at least a portion of said region of interest.

38. The computer program product of claim 31 wherein said polygonal surfaces are selected to provide a uniformly magnified area for at least a portion of said region of interest.

39. The computer program product of claim 26 wherein said region of interest, said lens surface, and said lens surface shape include a plurality of regions of interest, a plurality of lens surfaces, and a plurality of lens surface shapes, respectively.

40. The computer program product of claim 26 wherein said region of interest has a shape and at least a portion of said lens surface shape corresponds to said shape.

41. The computer program product of claim 26 wherein said lens surface shape distorts at least a portion of said region of interest.

42. The computer program product of claim 41 wherein said portion of said region of interest is magnified.

43. The computer program product of claim 41 wherein said portion of said region of interest includes magnified text and increased font size text.

44. The computer program product of claim 41 wherein said lens surface shape has at least one continuous tapered transition from said portion of said region of interest to at least one undistorted area of said visual information.

45. The computer program product of claim 26 wherein said visual information is a page, said page including a newspaper page, a magazine page, a telephone directory page, a map page, and a web page.

46. The computer program product of claim 45 wherein said region of interest includes a headline, a column, an article, a graphic, and an advertisement appearing on said page.

47. The computer program product of claim 26 wherein said display screen is contained in a handheld device.

48. The computer program product of claim 26 and further comprising code for moving said lens surface about said visual information over time to provide a dynamic presentation.

49. The computer program product of claim 26 wherein said region of interest is selected based on data provided by an external data source.

50. The computer program product of claim 49 where said external source includes a Global Positioning Satellite (GPS) receiver and a cellular telephone network.

51. A method for displaying a region of interest within visual information on a display screen, comprising:
applying a transformation to said visual information to improve visual detail in said region of interest by: creating a lens surface having a predetermined lens surface shape for said region of interest; and, creating a presentation by overlaying said visual information on said lens surface and projecting said lens surface with said visual information onto a plane; said lens surface shape providing overwriting of at least a portion of said visual information adjacent to said region of interest and blending of at least a portion of said lens surface into at least one undistorted area of said visual information; and,
displaying said presentation on said display screen.

52. The method of claim 51 wherein said lens surface shape preserves spatial orientation of said portion of said visual information adjacent to said region of interest.

53. The method of claim 51 wherein said lens surface shape provides sufficient space for said lens surface in said presentation.

54. The method of claim 51 and further comprising scaling said visual information to fit on said display screen.

55. The method of claim 51 wherein said lens surface is comprised of a plurality of polygonal surfaces constructed from a plurality of points sampled from said lens surface shape.

56. The method of claim 55 wherein said applying a transformation includes selecting parameters for said polygonal surfaces including size, shape, number, density, and pattern.

57. The method of claim 56 wherein said parameters for said polygonal surfaces are selected to optimize computation time for said presentation.

58. The method of claim 56 wherein said density of said polygonal surfaces is increased in regions surrounding said region of interest.

59. The method of claim 56 wherein said density of said polygonal surfaces is increased in regions where said lens surface shape has a slope that exceeds a predetermined value.

60. The method of claim 56 wherein said lens surface shape has a slope and said density of said polygonal surfaces is proportional to said slope.

61. The method of claim 56 wherein said polygonal surfaces are triangles.

62. The method of claim 56 wherein said polygonal surfaces each have a height above a basal plane, said height selected to provide a proportional magnification for at least a portion of said region of interest.

63. The method of claim 56 wherein said polygonal surfaces are selected to provide a uniformly magnified area for at least a portion of said region of interest.

64. The method of claim 51 wherein said region of interest, said lens surface, and said lens surface shape include a plurality of regions of interest, a plurality of lens surfaces, and a plurality of lens surfaces, and a plurality of lens surface shapes, respectively.

65. The method of claim 51 wherein said region of interest has a shape and at least a portion of said lens surface shape corresponds to said shape.

66. The method of claim 51 wherein said lens surface shape distorts at least a portion of said region of interest.

67. The method of claim 66 wherein said portion of said region of interest is magnified.

68. The method of claim 66 wherein said portion of said region of interest includes magnified text and increased font size text.

69. The method of claim 66 wherein said lens surface shape has at least one continuous tapered transition from said portion of said region of interest to at least one undistorted area of said visual information.

70. The method of claim 51 wherein said visual information is a page, said page including a newspaper page, a magazine page, a telephone directory page, a map page, and a web page.

71. The method of claim 70 wherein said region of interest includes a headline, a column, an article, a graphic, and an advertisement appearing on said page.

72. The method of claim 51 wherein said display screen is contained in a handheld device.

73. The method of claim 51 and further comprising means in the medium for moving said lens surface about said visual information over time to provide a dynamic presentation.

74. The method of claim 51 wherein said region of interest is selected based on data provided by an external data source.

75. The method of claim 74 where said external source includes a Global Positioning Satellite (GPS) receiver and a cellular telephone network.

76. A system for displaying a region of interest within visual information on a display screen, said system having memory and an input device, comprising:
a processor coupled to said memory, display screen, and input device and adapted for:
applying a transformation to said visual information to improve visual detail in said region of interest by: creating a lens surface having a predetermined lens surface shape for said region of interest; and, creating a presentation by overlaying said visual information on said lens surface and projecting said lens surface with said visual information onto a plane; said lens surface shape providing overwriting of at least a portion of said visual information adjacent to said region of interest and blending of at least a portion of said lens surface into at least one undistorted area of said visual information; and,
displaying said presentation on said display screen;
wherein said region of interest, said lens surface, and said lens surface shape include a plurality of regions of interest, a plurality of lens surfaces, and a plurality of lens surface shapes, respectively.

77. The system of claim 76 wherein said lens surface shape preserves spatial orientation of said portion of said visual information adjacent to said region of interest.

78. The system of claim 76 wherein said lens surface shape provides sufficient space for said lens surface in said presentation.

79. The system of claim 76 wherein said processor is further adapted for scaling said visual information to fit on said display screen.

80. The system of claim 76 wherein said lens surface is comprised of a plurality of polygonal surfaces constructed from a plurality of points sampled from said lens surface shape.

81. The system of claim 80 wherein said applying a transformation includes selecting parameters for said polygonal surfaces including size, shape, number, density, and pattern.

82. The system of claim 81 wherein said parameters for said polygonal surfaces are selected to optimize computation time for said presentation.

83. The system of claim 81 wherein said density of said polygonal surfaces is increased in regions surrounding said region of interest.

84. The system of claim 81 wherein said density of said polygonal surfaces is increased in regions where said lens surface shape has a slope that exceeds a predetermined value.

85. The system of claim 81 wherein said lens surface shape has a slope and said density of said polygonal surfaces is proportional to said slope.

86. The system of claim 81 wherein said polygonal surfaces are triangles.

87. The system of claim 81 wherein said polygonal surfaces each have a height above a basal plane, said height selected to provide a proportional magnification for at least a portion of said region of interest.

88. The system of claim 81 wherein said polygonal surfaces are selected to provide a uniformly magnified area for at least a portion of said region of interest.

89. The system of claim 76 wherein said region of interest has a shape and at least a portion of said lens surface shape corresponds to said shape.

90. The system of claim 76 wherein said lens surface shape distorts at least a portion of said region of interest.

91. The system of claim 90 wherein said portion of said region of interest is magnified.

92. The system of claim 90 wherein said portion of said region of interest includes magnified text and increased font size text.

93. The system of claim 90 wherein said lens surface shape has at least one continuous tapered transition from said portion of said region of interest to at least one undistorted area of said visual information.

94. The system of claim 76 wherein said visual information is a page, said page including a newspaper page, a magazine page, a telephone directory page, a map page, and a web page.

95. The system of claim 94 wherein said region of interest includes a headline, a column, an article, a graphic, and an advertisement appearing on said page.

96. The system of claim 76 wherein said display screen is contained in a handheld device.

97. The system of claim 76 wherein said processor is further adapted for moving said lens surface about said visual information over time to provide a dynamic presentation.

98. The system of claim 76 wherein said region of interest is selected based on data provided by an external data source.

99. The system of claim 98 where said external source includes a Global Positioning Satellite (GPS) receiver and a cellular telephone network.

* * * * *

UNITED STATES PATENT AND TRADEMARK OFFICE
CERTIFICATE OF CORRECTION

PATENT NO.       : 7,256,801 B2
APPLICATION NO.  : 10/856807
DATED            : August 14, 2007
INVENTOR(S)      : Baar et al.

It is certified that error appears in the above-identified patent and that said Letters Patent is hereby corrected as shown below:

1. Specification, column 2, line 67: Delete the period after the semi-colon.

2. Claim 25, column 11, line 51: Replace the word "where" with the word --wherein--.

3. Claim 50, column 13, line 16: Replace the word "where" with the word --wherein--.

4. Claim 51, column 13, line 28: Replace the word "providing" with the word --causing--.

5. Claim 51, column 13, line 30: Replace the word "blending" with the word --tapering--.

6. Claim 75, column 14, line 40: Replace the word "where" with the word --wherein--.

7. Claim 99, column 16, line 32: Replace the word "where" with the word --wherein--.

Signed and Sealed this

Thirtieth Day of October, 2007

JON W. DUDAS
*Director of the United States Patent and Trademark Office*